3,318,889
2-BENZIMIDAZOLE CARBAMATES
William G. Bywater, Upper Montclair, Bernard B. Brown, Westfield, and John M. Clegg, Upper Montclair, N.J., assignors to S. B. Penick & Company, New York, N.Y., a corporation of Delaware
No Drawing. Filed Oct. 14, 1963, Ser. No. 316,124
6 Claims. (Cl. 260—256.4)

This invention relates to carbamates and more particularly to carbamates of 2-hydroxyalkylbenzimidazoles. This invention based on the discovery of the novel benzimidazole carbamates having the formula—

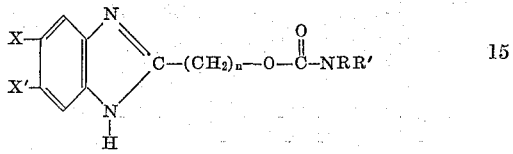

where X and X' are each hydrogen, alkyl, nitro or halogen, the halogen is preferably chlorine or bromine; $n$ is an integer from one to five; R and R' are hydrogen, alkyl, aralkyl or aryl and the acid addition salts and quaternaries of such benzimidazole carbamates.

The benzimidazole carbamates for this invention are readily prepared by the reaction (I) of an o-phenylenediamine or its hydrochloride with the appropriate hydroxycarboxylic acid. The hydroxyalkylbenzimidazole so formed is then converted to a carbamate by treatment with a properly substituted isocyanate (IIa) or carbamoyl chloride (IIb) or with urethane (IIc). This is illustrated by the following general reactions—

(I)

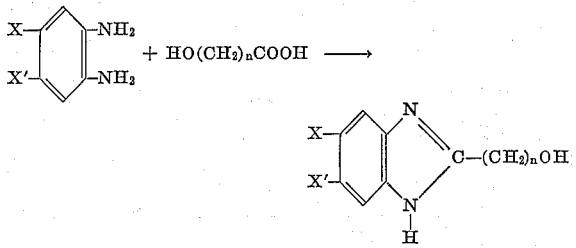

(IIa)

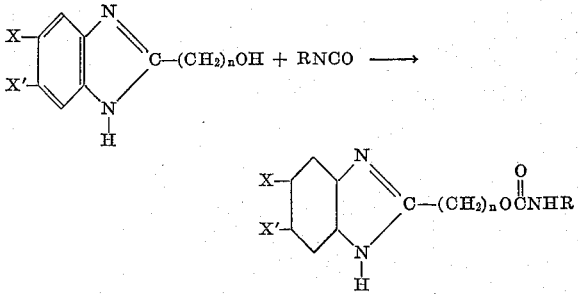

or
(IIb)

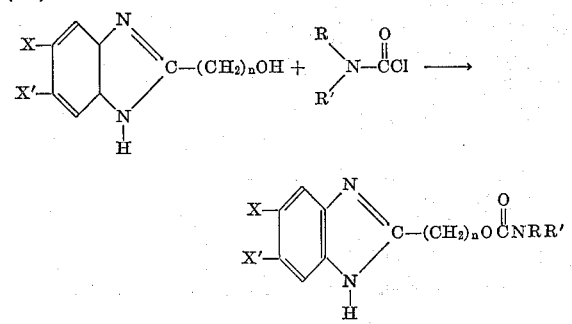

or
(IIc)

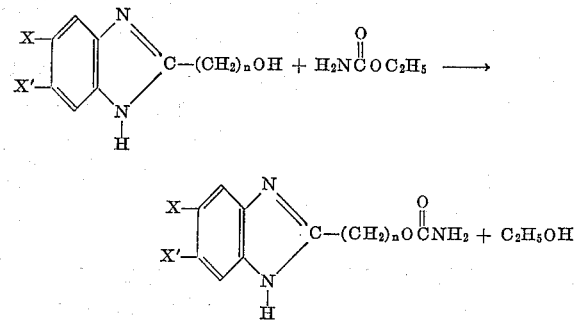

where X, $n$, R and R' are as indicated above.

The acid addition salts of these benzimidazole carbamates are prepared by reacting the benzimidazole carbamate base with an acid to form the salt. To form the benzimidazolium compounds, the base is reacted with the appropriate quaternizing agent. Both of the above salt-forming reactions are best carried out in inert solvents.

The initial reaction of the diaminobenzene with the hydroxy acid takes place rapidly in acidified aqueous solutions. The reaction runs substantially to completion within a period of four to six hours. The resultant hydroxyalkyl benzimidazole base is substantially insoluble in alkaline solutions and can be isolated from the reaction medium by raising the pH.

To convert the hydroxyalkylbenzimidazole to the carbamate, the free base is dissolved in an organic base such as pyridine and the isocyanate or carbamoyl chloride is added at about 40° C. After raising the temperature to reflux for about thirty minutes, the desired carbamate crystallizes upon cooling. The carbamate is isolated by filtration. In some instances, because of the high solubility of the product, it is necessary to remove a portion of the solvent. Alternatively, the free base may be refluxed with urethane in the presence of a catalyst in an inert solvent to give the unsubstituted carbamate.

To convert the benzimidazole carbamates to their acid salts, the free base, dissolved in acetonitrile, is reacted with the appropriate acid such as hydrochloric acid, acetic acid or tartaric acid.

The benzimidazolium carbamate compounds are prepared by reacting a solution of a haloquaternizing agent base or its addition salts with a solution of the benzimidazole carbamate. The preferred solvent for this reaction is acetonitrile. Other inert solvents for the quaternizing agent or the free base may be used.

When a 1-alkyl-substituted benzimidazole is to be prepared, the appropriate N-substituted-o-phenylenediamine is used as the starting material. When substituents are to be included at the X and X' position of the benzimidazole moiety an appropriately substituted-o-phenylenediamine is used as the starting material.

The compounds of this invention have the pharmacological property of increasing the time required for the onset of Metrozol-induced shock and decreasing the time for the onset of sodium pentobarbital-induced sleep. The compounds are rapidly metabolized since no significant prolongation of the pentobarbital sleeping time is noted.

The 5,6-dichlorobenzimidazole carbamates also have some specific effects on the cecal action of poultry. The compounds, as a result, are active against cecal coccidiosis induced by *E. tenella*. Against such an infection, they are at least as active as 5-nitrobenzimidazole (U.S. Patent 3,054,722) in mitigating coccidial infections in poultry.

The carbamates of this invention are also useful as intermediates in the preparation of benzimidazolium sensitizers useful in sensitizing silver halide emulsions for photographic purposes.

The preparation of some of the benzimidazole carbamates of this invention is described in the appended examples. The examples are merely illustrative and are not meant in any way to confine the scope of this invention. It should be understood that each of the compounds within the scope of this invention has certain advantages for certain specific purposes. Further, where specific terminology is used or specific materials are mentioned, it is understood that the invention is not restricted to such terms or materials but that all useful and functional equivalents of such terms and materials are intended and included thereby. All temperatures are expressed as degrees centigrade.

EXAMPLE 1

*5,6-dichloro-2-hydroxymethylbenzimidazole*

Reflux a mixture of 0.5 mole of 4,5-dichloro-o-phenylenediamine with 0.75 mole of glycolic acid in a solution consisting of 400 ml. of conc. hydrochloric acid and 400 ml. of water. After a period of four to six hours, an additional one liter of water is added to dissolve the solids and the hot solution is treated with 40% caustic until a pH of 7.5 is reached. The mixture is cooled, the product is removed by filtration, washed and dried. The yield of crude product, M.P. 235–240° (with decomposition), is 82.3%. Recrystallization from methanol gives a product having a M.P. of 270–271° with decomposition.

Calc'd for $C_8H_6Cl_2N_2O$: N, 12.91%. Found: N, 13.05%.

EXAMPLE 2

*5,6-dichloro-2-N-methylcarbamoxymethylbenzimidazole*

Dissolve 0.03 mole of 5,6-dichloro-2-hydroxymethylbenzimidazole in 75 ml. of dry pyridine at 70° C. The solution is cooled with stirring to 40° C. and 0.0475 mole of methyl isocyanate is added. This results in a slight exothermic reaction, and the temperature is raised to 70° for thirty minutes. Upon cooling, a white solid crystallizes out which is removed by filtration and dried. A white crystalline solid, M.P. 225° (dec.) is obtained in 46% yield.

Calc'd for $C_{10}H_9Cl_2N_3O_2$: N, 15.33%. Found: N, 15.61%.

EXAMPLE 3

*5,6-dichloro-2-N,N-dimethylcarbamoxymethyl-benzimidazole*

To a solution containing 0.05 mole of 5,6-dichloro-2-hydroxymethylbenzimidazole dissolved in 150 ml. of dry pyridine is added 0.06 mole of dimethylcarbamoyl chloride. The mixture is refluxed for four hours. The pyridine is removed by distillation under reduced pressure. Water is added to the residue and the resulting oil slowly crystallizes. The solid is filtered, washed and dried. The oily material is first crystallized from 25% isopropyl alcohol and then from toluene. A 45.5% yield of product, M.P. 176–178°, is obtained.

Calc'd for $C_{11}H_{11}Cl_2N_3O_2$: N, 14.58%. Found: N, 14.48%.

EXAMPLE 4

*3 - (4' - amino - 2' - n - propyl - 5' - pyrimidyl)methyl-5,6 - dichloro - 2-N-ethylcarbamoxymethylbenzimidazolium bromide dihydrobromide*

Equimolar amounts of 4-amino-5-bromomethyl-2-n-propyl-pyrimidine dihydrobromide and 5,6-dichloro-2-N-ethylcarbamoxymethylbenzimidazole are dissolved in methanol and an equal volume of acetonitrile added. After reaction, the methanol is removed by distillation and the product isolated from the acetonitrile. A 70% yield is obtained.

Calc'd for $C_{19}H_{25}Br_3Cl_2N_6O_2$: N, 12.36. Found: N, 12.05.

EXAMPLE 5

*2-α-carbamoxyethylbenzimidazole*

A mixture consisting of 0.5 mole of 2-α-hydroxyethylbenzimidazole, 0.55 mole of urethane and a catalytic amount of freshly distilled aluminum isopropylate is refluxed in toluene for a total of 32 hours, during which time five 2–3 g. additional portions of aluminum isopropylate is added. The mixture is filtered to give 82 g. of product having a melting range of 175–240°.

The solids are crystallized from water to give a first crop of 19.5 g., M.P. 183–190°, and a second crop on further standing of 20 g., M.P. 178–180°.

Recrystallization of the first crop from 50% aqueous alcohol gave 11.5 g. of the desired product, M.P. 207–207.5°.

Calc'd for $C_{10}H_{11}N_3O_2$: C, 58.5; H, 5.4; N, 20.5. Found: C, 59.15; H, 5.55; N, 20.05.

EXAMPLE 6

*3 - (4 - amino - 2' - n - propyl - 5' - pyrimidyl)methyl - 5, 6 - dichloro - 2 - N,N - dimethylcarbamoxymethylbenzimidazolium bromide dihydrobromide*

Equimolar amounts of 4 - amino - 5 - bromomethyl-2-n-propyl-pyrimidine dihydrobromide and 5,6-dichloro-2-N,N-dimethylcarbamoxymethylbenzimidazole are dissolved in methanol and an equal volume of acetonitrile added. After reaction, the methanol is removed by distillation and the product isolated from the acetonitrile. A 50% yield was obtained.

Calc'd for $C_{19}H_{25}Br_3Cl_2N_6O_2$: N, 12.36. Found: N, 11.81.

The compound, admixed with the feeding ration, was fed to replicated groups of ten two-week old Cornish-Rock chicks. These chicks were then infested with cecal coccidiosis by inoculation of 30,000 oocysts of *E. tenella* into the crop. When the compound was admixed with the feeding ration at a concentration of 0.035%, it gave an overall weight gain of 51% as compared with 25% weight gain for groups of ten unmedicated inoculated birds. Further, the number of deaths was reduced from 70% to 20% by the medication. A comparative cecal score based on post-mortem cecal weights showed that the unmedicated birds had a score of 4 as compared to a score of 2.2 for those birds receiving the medication. A comparative blood score based on the extent of hemorrhaging showed that the medication reduced the hemorrhaging from a score of 5, indicating extensive hemorrhaging, to a score of 2, indicating only minor occasional bleeding.

The novel compounds of this invention include:

5,6-dichloro-2-N-methylcarbamoxymethylbenzimidazole
5,6-dibromo-2-N-methylcarbamoxymethylbenzimidazole
5,6-diiodo-2-N-methylcarbamoxymethylbenzimidazole
5,6-dimethyl-2-N-methylcarbamoxymethylbenzimidazole
5,6-dichloro-2-β-N-methylcarbamoxyethylbenzimidazole
5,6-dibromo-2-β-N-methylcarbamoxyethylbenzimidazole
5,6-diiodo-2-β-N-methylcarbamoxyethylbenzimidazole
5,6-dimethyl-2-β-N-methylcarbamoxyethylbenzimidazole
5,6-dichloro-2-γ-methylcarbamoxypropylbenzimidazole
5,6-dibromo-2-γ-N-methylcarbamoxypropylbenzimidazole
5,6-diiodo-2-γ-N-methylcarbamoxypropylbenzimidazole
5,6-dimethyl-2-γ-N-methylcarbamoxypropyl-benzimidazole
5,6-dichloro-2-N-ethylcarbamoxymethylbenzimidazole
5,6-dibromo-2-N-ethylcarbamoxymethylbenzimidazole
5,6-diiodo-2-N-ethylcarbamoxymethylbenzimidazole
5,6-dimethyl-2-N-ethylcarbamoxymethylbenzimidazole
5,6-dichloro-2-β-N-ethylcarbamoxyethylbenzimidazole
5,6-dibromo-2-β-N-ethylcarbamoxyethylbenzimidazole
5,6-diiodo-2-β-N-ethylcarbamoxyethylbenzimidazole 5,6-dimethyl-2-β-ethylcarbamoxyethylbenzimidazole
5,6-dichloro-2-γ-N-ethylcarbamoxypropylbenzimidazole
5,6-dibromo-2-γ-N-ethylcarbamoxypropylbenzimidazole
5,6-diiodo-2-γ-N-ethylcarbamoxypropylbenzimidazole
5,6-dimethyl-2-γ-N-ethylcarbamoxypropylbenzimidazole
5,6-dichloro-2-N,N-dimethylcarbamoxymethyl-benzimidazole 2-α (or β) carbamoxyethyl-5(6)-dichlorobenzimidazole
2-α (or β) carbamoxyethyl-5(6)-methylbenzimidazole
2-α (or β) carbamoxyethyl-5(6)-nitrobenzimidazole Representative compounds of various classes within the scope of this invention are set forth in Table 1 together with a tabulation of their melting points or other constants.

TABLE 1

| Name | Emp. Form | M.P. | Anal. (percent) Found | Calc'd |
|---|---|---|---|---|
| 5,6-dichloro-2-N-methylcarbamoxymethylbenzimidazole | $C_{10}H_9Cl_2N_3O_2$ | 225° C. dec. | N, 15.61 | 15.33 |
| 5,6-dichloro-2-β-N-methylcarbamoxyethylbenzimidazole | $C_{11}H_{11}Cl_2N_3O_2$ | 147–153° C. dec. | C, 45.68 | 45.85 |
| 5,6-dichloro-2-γ-N-methylcarbamoxypropylbenzimidazole | $C_{12}H_{13}Cl_2N_3O_2$ | 178–180° C. | N, 13.89 | 13.91 |
| 5,6-dichloro-2-N-ethylcarbamoxymethylbenzimidazole | $C_{11}H_{11}Cl_2N_3O_2$ | 225–227° C. | N, 15.15 | 14.58 |
| 5,6-dichloro-2-N,N-dimethylcarbamoxymethylbenzimidazole. | $C_{11}H_{11}Cl_2N_3O_2$ | 173–177° C. | N, 14.48 | 14.58 |
| 5,6-dichloro-2-α-N-methylcarbamoxybenzylbenzimidazole | $C_{16}H_{13}Cl_2N_3O_2$ | 157–158° C. dec. | N, 11.98 | 12.00 |
| 5,6-dichloro-2-α-N-ethylcarbamoxybenzylbenzimidazole | $C_{17}H_{15}Cl_2N_3O_2$ | 171–173° C. | N, 11.72 | 11.54 |
| 2-α-carbamoxyethylbenzimidazole | $C_{10}H_{11}N_3O_2$ | 207–207.5° C. | C, 59.15; H, 5.55; N, 20.05 | 58.5; 5.4; 20.5 |
| 2-N-methylcarbamoxymethylbenzimidazole | $C_{10}H_{11}N_3O_2$ | 120–121° C. | 19.55 | 20.48 |
| 2-α-N-methylcarbamoxyethylbenzimidazole | $C_{11}H_{13}N_3O_2$ | 110–111° C. | 17.75 | 19.17 |
| 5(6)-chloro-2-N-methylcarbamoxymethylbenzimidazole | $C_{10}H_{10}ClN_3O_2$ | 99–100° C. | | |
| 5(6)-chloro-2-α-N-methylcarbamoxyethylbenzimidazole | $C_{11}H_{12}ClN_3O_2$ | 203–205° C. | | |
| 5(6)-nitro-2-N-methylcarbamoxymethylbenzimidazole | $C_{10}H_{10}N_4O_4$ | 199–201° C. | | |
| 3-(4'-amino-2'-n-propyl-5'-pyrimidylmethyl)-2-(α-carbamoxymethyl)benzimidazolium bromide hydrobromide. | $C_{18}H_{24}Br_2N_6O_2$ | | N, 15.59 | 16.28 |
| 3-(4'-amino-2'-n-propyl-5'-pyrimidyl)methyl-5(6)-chloro-2-α-N-methylcarbamoxyethylbenzimidazolium bromide dihydrobromide. | $C_{19}H_{26}Br_3ClN_6O_2$ | | N, 13.15 | 13.00 |
| 3-(4'-amino-2'-n-propyl-5'-pyrimidylmethyl)5,6-dichloro-2-(N-ethylcarbamoxymethylbenzimidazolium bromide dihydrobromide. | $C_{19}H_{25}Br_3Cl_2N_6O_2$ | 170–175° C. dec. | N, 12.05 | 12.36 |
| 3-(4'-amino-2'-n-propyl-5'-pyrimidylmethyl)5,6-dichloro-2-(N,N-dimethylcarbamoxymethyl)-benzimidazolium bromide dihydrobromide. | $C_{19}H_{25}Br_3Cl_2N_6O_2$ | 270° C. (charring) | N, 11.81 | 12.36 |

5,6-dibromo-2-N,N-dimethylcarbamoxymethyl-benzimidazole
5,6-diiodo-2-N,N-dimethylcarbamoxymethyl-benzimidazole
5,6-dimethyl-2-N,N-dimethylcarbamoxymethyl-benzimidazole
5,6-dichloro-2-β-N,N-dimethylcarbamoxyethyl-benzimidazole
5,6-dibromo-2-β-N,N-dimethylcarbamoxyethyl-benzimidazole
5,6-diiodo-2-β-N,N-dimethylcarbamoxyethyl-benzimidazole
5,6-dimethyl-2-β-N,N-dimethylcarbamoxyethyl-benzimidazole
5,6-dichloro-2-γ-N,N-dimethylcarbamoxypropyl-benzimidazole
5,6-dibromo-2-γ-N,N-dimethylcarbamoxypropyl-benzimidazole
5,6-diiodo-2-γ-N,N-dimethylcarbamoxypropyl-benzimidazole
5,6-dimethyl-2-γ-N,N-dimethylcarbamoxypropyl-benzimidazole
5,6-dichloro-2-phenylcarbamoxymethylbenzimidazole
5,6-dibromo-2-phenylcarbamoxymethylbenzimidazole
5,6-diiodo-2-phenylcarbamoxymethylbenzimidazole
5,6-dimethyl-2-carbamoxymethylbenzimidazole
5,6-dichloro-2-β-N-phenylcarbamoxyethylbenzimidazole
5,6-dibromo-2-β-N-phenylcarbamoxyethylbenzimidazole
5,6-diiodo-2-β-N-phenylcarbamoxyethylbenzimidazole
5,6-dimethyl-2-β-N-phenylcarbamoxyethylbenzimidazole
5,6-dichloro-2-γ-N-phenylcarbomoxypropylbenzimidazole
5,6-dibromo-2-γ-N-phenylcarbamoxypropylbenzimidazole
5,6-diiodo-2-γ-N-phenylcarbamoxypropylbenzimidazole
5,6-dimethyl-2-γ-N-phenylcarbamoxypropyl-benzimidazole
2-carbamoxymethylbenzimidazole
2-carbamoxymethyl-5(6)-chlorobenzimidazole
2-carbamoxymethyl-5(6)-dichlorobenzimidazole
2-carbamoxymethyl-5(6)-methylbenzimidazole
2-carbamoxymethyl-5(6)-nitrobenzimidazole
2-α (or β) carbamoxyethylbenzimidazole
2-α (or β) carbamoxyethyl-5(6)-chlorobenzimidazole

We claim:

1. A benzimidazole carbamate of the formula—

$$X-\underset{X'}{\overset{}{\bigotimes}}-C-(CH_2)_n-O-\overset{O}{\underset{}{C}}-NRR'$$

where X and X' are each selected from the group consisting of hydrogen, lower alkyl, nitro and halogen; n is an integer from 1 to 5; R and R' are each selected from the group consisting of hydrogen, lower alkyl, and monocyclic aryl; and their non-toxic quaternary and acid addition salts.

2. 5,6 - dichloro - 2 - N - methylcarbamoxymethyl-benzimidazole.

3. 5,6 - dichloro - 2 - N,N-dimethylcarbamoxymethyl-benzimidazole.

4. 5,6 - dichloro-2-γ-N - methylcarbamoxypropylbenz-imidazole.

5. 3 - (4 - amino - 2' - n - propyl-5'-pyrimidyl)methyl-5,6 - dichloro-2-N,N - dimethylcarbamoxymethylbenzim-idazolium bromide dihydrobromide.

6. 5(6)-nitro-2 - N - methylcarbamoxymethylbenzim-idazole.

References Cited by the Examiner

UNITED STATES PATENTS 3,125,598   3/1964   Kuhle et al. _____ 260—471
3,169,985   2/1965   de Stevens _____ 260—471
3,253,904   5/1966   Harrison _____ 260—471

OTHER REFERENCES

Rodd, Ed., Chemistry of Carbon Compounds, vol. I, part B, Elsevier Publishing Co., New York, 1952, pages 900–902.

Theilheimer, Synthetische Methoden der Organischem Chemie, vol. 4, page 89 (Reaction 255).

ALEX MAZEL, *Primary Examiner.*

MARY U. O'BRIEN, *Assistant Examiner.*

UNITED STATES PATENT OFFICE
CERTIFICATE OF CORRECTION

Patent No. 3,318,889                 May 9, 1967

William G. Bywater et al.

It is hereby certified that error appears in the above numbered patent requiring correction and that the said Letters Patent should read as corrected below.

Column 1, lines 51 to 57, the formula should appear as shown below instead of as in the patent:

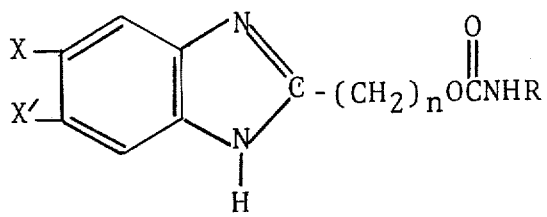

column 1, lines 58 to 65, the formula should appear as shown below instead of as in the patent:

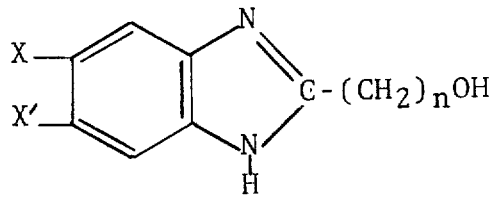

column 4, line 37, for "infested" read -- infected --; column 5, line 64, for "5,6-dichloro-2-γ-N-phenylcarbomoxypropylbenzimidazole" read -- 5,6-dichloro-2-γ-N-phenylcarbamoxypropylbenzimidazole --.

Signed and sealed this 28th day of November 1967.

(SEAL)
Attest:

EDWARD M. FLETCHER, JR.
Attesting Officer

EDWARD J. BRENNER
Commissioner of Patents